US012537339B2

(12) United States Patent
Lu et al.

(10) Patent No.: US 12,537,339 B2
(45) Date of Patent: Jan. 27, 2026

(54) RJ45 SOCKET

(71) Applicant: Shenzhen Alex Connector Co Ltd, Shenzhen (CN)

(72) Inventors: Haiqiu Lu, Shenzhen (CN); Xiaoan Wang, Shenzhen (CN); Xiaobing Zhu, Shenzhen (CN); Qi Peng, Shenzhen (CN)

( * ) Notice: Subject to any disclaimer, the term of this patent is extended or adjusted under 35 U.S.C. 154(b) by 328 days.

(21) Appl. No.: 18/336,543

(22) Filed: Jun. 16, 2023

(65) Prior Publication Data

US 2024/0106164 A1 Mar. 28, 2024

(30) Foreign Application Priority Data

Sep. 22, 2022 (CN) ......................... 202222511741.9

(51) Int. Cl.
*H01R 13/627* (2006.01)
*H01R 24/64* (2011.01)

(52) U.S. Cl.
CPC ......... *H01R 13/6272* (2013.01); *H01R 24/64* (2013.01)

(58) Field of Classification Search
CPC . H01R 13/6272; H01R 13/6271; H01R 24/64
USPC ........................................ 439/353, 350, 357
See application file for complete search history.

(56) References Cited

U.S. PATENT DOCUMENTS

| | | | | |
|---|---|---|---|---|
| 5,579,425 | A | 11/1996 | Lampert et al. | |
| 9,028,269 | B2 * | 5/2015 | Hsu | H01R 13/6582 439/357 |
| 9,716,356 | B2 * | 7/2017 | Hsieh | H01R 13/6271 |
| 10,476,212 | B2 | 11/2019 | Bopp et al. | |
| 10,756,497 | B2 | 8/2020 | Tanaka | |
| 10,811,831 | B1 | 10/2020 | Wu et al. | |
| 11,146,013 | B2 | 10/2021 | Lee | |
| 11,296,460 | B2 | 4/2022 | Kurita | |
| 2006/0035520 | A1 * | 2/2006 | Huang | H01R 13/6582 439/346 |
| 2010/0167575 | A1 * | 7/2010 | Chan | H01R 27/00 439/357 |
| 2014/0308840 | A1 * | 10/2014 | Kuo | H01R 12/7082 439/357 |
| 2016/0322767 | A1 * | 11/2016 | Little | H01R 13/516 |
| 2017/0207574 | A1 | 7/2017 | Hsieh | |
| 2021/0336387 | A1 | 10/2021 | Little | |

* cited by examiner

*Primary Examiner* — Gary F Paumen

(57) ABSTRACT

The present utility model provides an RJ45 socket, comprising a socket main body and a housing surrounding the socket main body, wherein the housing is provided with a lock catch structure that is in lock-catch fit with an insertion tongue structure of an RJ45 plug, the lock catch structure comprises a lock catch elastic sheet, and a V-shaped slope structure is arranged in a middle part of the lock catch elastic sheet. The present utility model has the following beneficial effects: with the improvement of the lock catch structure of the RJ45 socket, an RJ45 plug can be directly pulled out and unlocked without pressing after being inserted into the RJ45 socket.

8 Claims, 4 Drawing Sheets

RJ45 SOCKET

TECHNICAL FIELD

The present utility model relates to a connector, and in particular to an RJ45 socket.

BACKGROUND

For the insertion of the conventional RJ45 socket, as shown in FIG. 1, an RJ45 plug 20 is inserted into an RJ45 socket 10 and locked by a lock catch structure 101 of the RJ45 socket 10, and an insertion tongue structure 201 of the RJ45 plug 20 needs to be pressed to unlock the plug, so that the plug can be pulled out, as shown in FIG. 2. The unlocking operation is troublesome, for example, an installation space is narrow, which makes it difficult to unlock by pressing.

Therefore, how to provide a lock catch structure of a novel RJ45 socket to avoid unlocking by pressing is a technical problem to be solved urgently by those skilled in the art.

SUMMARY

In order to solve the problems in the prior art, the present utility model provides an RJ45 socket that can be unlocked without pressing.

The present utility model provides an RJ45 socket, comprising a socket main body and a housing surrounding the socket main body, wherein the housing is provided with a lock catch structure that is in lock-catch fit with an insertion tongue structure of an RJ45 plug, the lock catch structure comprises a lock catch elastic sheet, and a V-shaped slope structure is arranged in a middle part of the lock catch elastic sheet.

As a further improvement of the present utility model, the housing is a metal housing.

As a further improvement of the present utility model, the housing is a square housing with a bottom surface, side surfaces, and a top surface, and the lock catch elastic sheet is arranged on the top surface of the housing.

As a further improvement of the present utility model, the V-shaped slope structure of the lock catch elastic sheet protrudes from top to bottom.

As a further improvement of the present utility model, the V-shaped slope structure of the lock catch elastic sheet is arranged along an insertion direction of the RJ45 plug.

As a further improvement of the present utility model, the V-shaped slope structure of the lock catch elastic sheet consists of a first inclined plane located at an inner side and a second inclined plane located at an outer side, when the RJ45 plug is inserted into the RJ45 socket, a tail end of the insertion tongue structure of the RJ45 plug abuts against the first inclined plane, and under the pressure of the first inclined plane, the insertion tongue structure of the RJ45 plug is in a downward deformation state.

As a further improvement of the present utility model, a protruding part of the insertion tongue structure of the RJ45 plug is a V-shaped slope structure protruding from bottom to top.

As a further improvement of the present utility model, two sides of the lock catch elastic sheet are provided with separation gaps that provide elastic and movable spaces for the lock catch elastic sheet.

The present utility model has the following beneficial effects: the lock catch structure of the RJ45 socket is improved by the above solutions, so that an RJ45 plug can be directly pulled out and unlocked without pressing after being inserted into the RJ45 socket.

BRIEF DESCRIPTION OF THE DRAWINGS

In order to more clearly illustrate the technical solutions in the embodiments of the present utility model, the drawings required to be used in the description of the embodiments are briefly introduced below. It is obvious that the drawings in the description below are only some embodiments of the present utility model, and those of ordinary skill in the art can obtain other solutions according to these drawings without creative efforts.

DETAILED DESCRIPTION OF THE EMBODIMENTS

It should be noted that the embodiments and features in the embodiments of the present utility model can be combined with each other without conflict.

In the description of the present utility model, it should be understood that orientation or location relationships indicated by terms “central”, “transverse”, “longitudinal”, “upper”, “lower”, “front”, “rear”, “left”, “right”, “vertical”, “horizontal”, “top”, “bottom”, “inner”, “outer” and the like are orientation or location relationships based on the accompanying drawings, and are merely intended for ease of describing the present utility model and simplifying description, rather than indicating or implying that a specified apparatus or element needs to have a specific orientation or needs to be constructed and operated in a specific orientation. Therefore, such terms cannot be construed as a limitation on the scope of the present utility model. In addition, the terms “first”, “second”, and the like are merely intended for a purpose of description, and shall not be understood as an indication or implication of relative importance or implicit indication of a quantity of indicated technical features. Therefore, a feature limited by “first”, “second”, or the like may explicitly or implicitly include one or more features. In the descriptions of the present utility model, unless otherwise specified, “a plurality of” means two or more.

In descriptions of the present utility model, it should be noted that unless otherwise expressly specified and limited, terms “mount”, “interconnect”, and “connect” should be understood in a broad sense. For example, such terms may indicate a fixed connection, a detachable connection, or an integral connection; and may indicate direct interconnection, indirect interconnection through an intermediate medium, or internal communication between two elements. Those of ordinary skill in the art may understand specific meanings of the foregoing terms in the present utility model according to a specific condition.

The present utility model is further illustrated below with reference to the accompanying drawing and specific embodiments.

Figure 1:
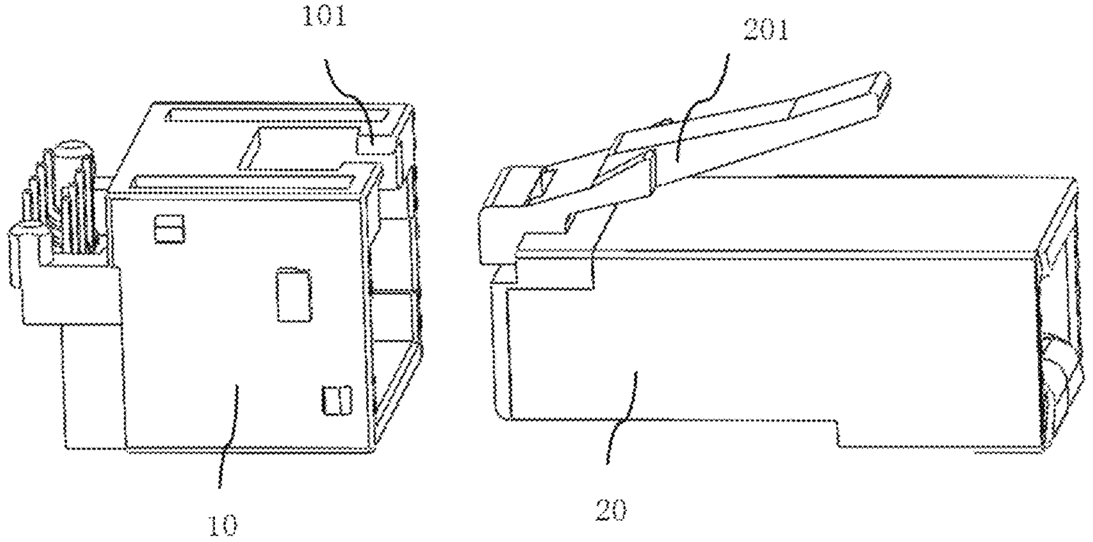
FIG. 1 (prior art)
FIG. 1 is a schematic diagram of a conventional RJ45 socket.
Figure 2:
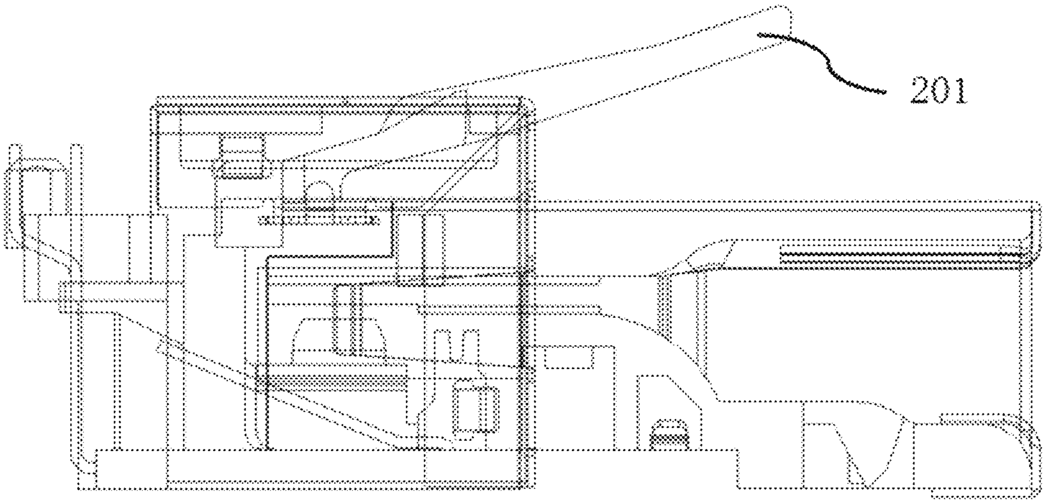
FIG. 2 (prior art)
FIG. 2 is a schematic diagram of assembly of a conventional RJ45 socket.
Figure 3:
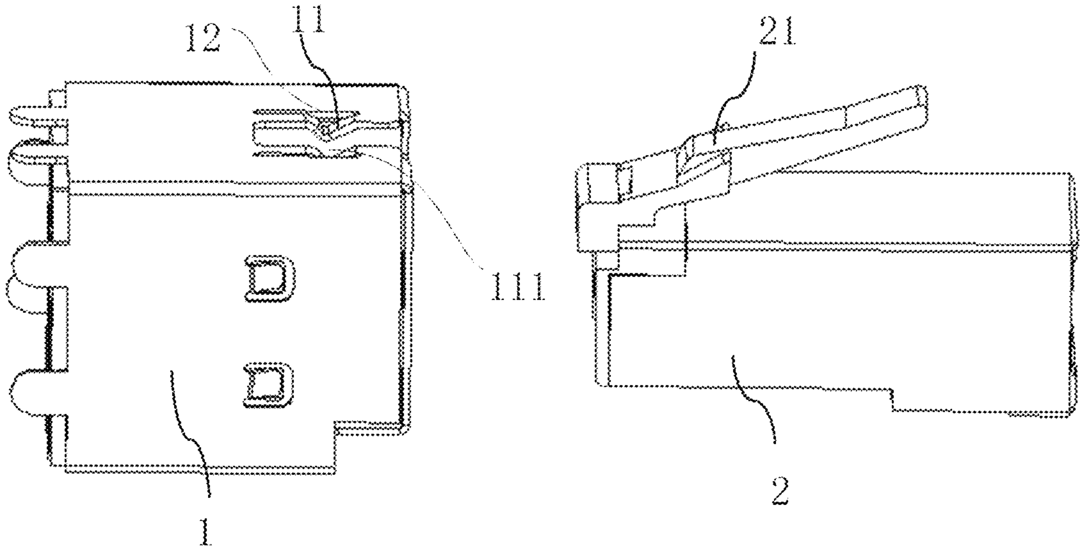
FIG. 3 is a schematic diagram of an RJ45 socket according to the present utility model.
Figure 4:
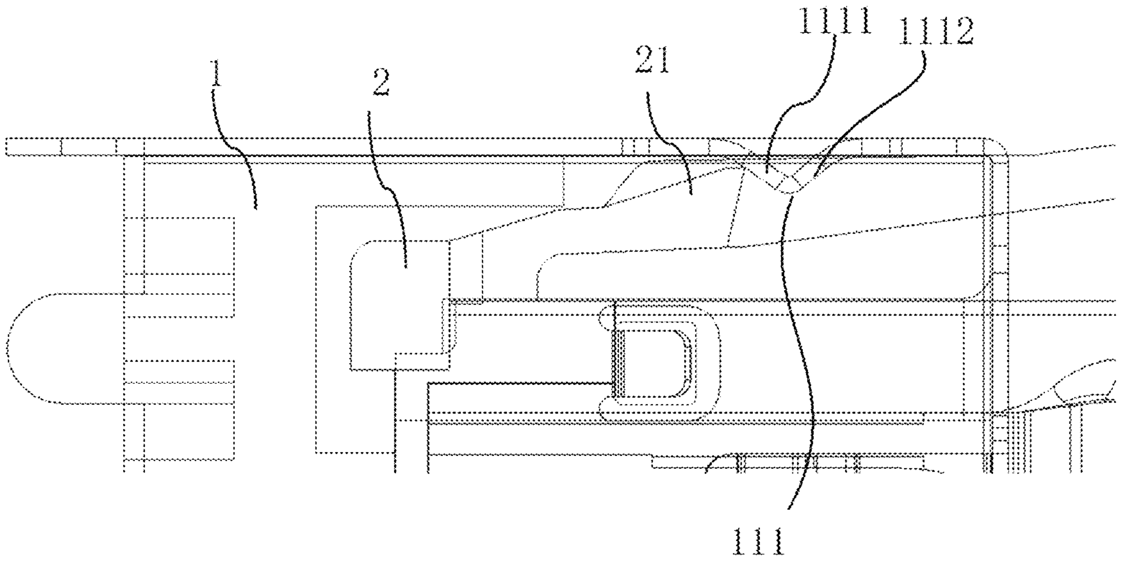
FIG. 4 is a schematic diagram of assembly of an RJ45 socket according to the present utility model.

As shown in FIGS. 3 and 4, an RJ45 socket 1 comprises a socket main body and a housing surrounding the socket main body, wherein the housing is provided with a lock catch structure 11 that is in lock-catch fit with an insertion tongue structure 21 of an RJ45 plug 2, the lock catch structure 11 comprises a lock catch elastic sheet, and a V-shaped slope structure 111 is arranged in a middle part of the lock catch elastic sheet.

The housing is a metal housing.

The housing is a square housing with a bottom surface, side surfaces, and a top surface, and the lock catch elastic sheet is arranged on the top surface of the housing.

The V-shaped slope structure 111 of the lock catch elastic sheet protrudes from top to bottom.

The V-shaped slope structure 111 of the lock catch elastic sheet is arranged along an insertion direction of the RJ45 plug 2.

The V-shaped slope structure 111 of the lock catch elastic sheet consists of a first inclined plane 1111 located at an inner side and a second inclined plane 1112 located at an outer side, when the RJ45 plug 2 is inserted into the RJ45 socket 1, a tail end of the insertion tongue structure 21 of the RJ45 plug 2 abuts against the first inclined plane 1111, and under the pressure of the first inclined plane 1111, the insertion tongue structure 21 of the RJ45 plug 2 is in a downward deformation state, and the second inclined plane 1112 provides guidance for the insertion of the insertion tongue structure 21 of the RJ45 plug 2.

The protruding part of the insertion tongue structure 21 of the RJ45 plug 2 is a V-shaped slope structure protruding from bottom to top, namely a conventional structure; and the present utility model can be achieved without changing a structure of the conventional RJ45 plug, which reduces the modification cost. This socket is suitable for the current RJ45 plug, and has high compatibility.

Two sides of the lock catch elastic sheet are provided with separation gaps 12 that provide elastic and movable spaces for the lock catch elastic sheet, so that the V-shaped slope structure 111 can be separated from the housing.

The present utility model provides an RJ45 socket 1, the lock catch structure of the RJ45 socket is improved, and when the RJ45 plug is inserted into the RJ45 socket, the plug can be directly pulled out and unlocked without pressing, so that the operation is convenient, and it is beneficial to the unlocking operation in a narrow space.

The foregoing is a more detailed description of the present utility model in combination with specific preferred embodiments, and it cannot be considered that the specific implementation of the present utility model is only limited to these descriptions. For those of ordinary skill in the technical field to which the present utility model belongs, on the premise of not departing from the concept of the present utility model, some simple deductions or replacements can also be made, which should be regarded as falling within the protection scope of the present utility model.

The invention claimed is:

1. An RJ45 socket for mating with an RJ45 plug, comprising a socket main body and a housing surrounding the socket main body, wherein the housing is provided with a lock catch structure that is configured to lock-catch fit with an insertion tongue structure of the RJ45 plug, the lock catch structure comprises a lock catch elastic sheet comprising a first flat segment, a V-shaped slope structure and a second flat segment, and the V-shaped slope structure is arranged between the first flat segment and the second flat segment, the first flat segment and the second flat segment are both integrally connected to the housing.

2. The RJ45 socket according to claim 1, wherein the V-shaped slope structure of the lock catch elastic sheet protrudes from top to bottom.

3. The RJ45 socket according to claim 1, wherein the V-shaped slope structure of the lock catch elastic sheet is arranged along an insertion direction of the RJ45 plug.

4. The RJ45 socket according to claim 1, wherein the V-shaped slope structure of the lock catch elastic sheet consists of a first inclined plane located at an inner side and a second inclined plane located at an outer side, wherein when the RJ45 plug is inserted into the RJ45 socket, a tail end of the insertion tongue structure of the RJ45 plug abuts against the first inclined plane, and under the pressure of the first inclined plane, the insertion tongue structure of the RJ45 plug is in a downward deformation state.

5. The RJ45 socket according to claim 1, wherein two sides of the lock catch elastic sheet are provided with separation gaps that provide elastic and movable spaces for the lock catch elastic sheet.

6. The RJ45 socket according to claim 1, wherein the housing is a metal housing.

7. The RJ45 socket according to claim 1, wherein the housing is a square housing with a bottom surface, side surfaces, and a top surface, and the lock catch elastic sheet is arranged on the top surface of the housing.

8. The RJ45 socket according to claim 1, wherein the housing is provided with an opening, the lock catch structure comprises two lock catch elastic sheets symmetrically arranged at two sides of the opening.

* * * * *